US012444870B2

(12) United States Patent
Kobayashi et al.

(10) Patent No.: US 12,444,870 B2
(45) Date of Patent: Oct. 14, 2025

(54) POWER CONNECTOR AND POWER OUTLET

(71) Applicant: OMRON Corporation, Kyoto (JP)

(72) Inventors: Minoru Kobayashi, Kyoto (JP); Nanako Hinokitani, Kyoto (JP); Shuichi Itoda, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 287 days.

(21) Appl. No.: 18/037,748

(22) PCT Filed: Sep. 14, 2021

(86) PCT No.: PCT/JP2021/033630
§ 371 (c)(1),
(2) Date: May 18, 2023

(87) PCT Pub. No.: WO2022/130712
PCT Pub. Date: Jun. 23, 2022

(65) Prior Publication Data

US 2023/0411886 A1 Dec. 21, 2023

(30) Foreign Application Priority Data

Dec. 15, 2020 (JP) ................................ 2020-207339

(51) Int. Cl.
*H01R 13/10* (2006.01)
*H01R 13/639* (2006.01)
*H01R 13/652* (2006.01)

(52) U.S. Cl.
CPC ........... *H01R 13/10* (2013.01); *H01R 13/639* (2013.01); *H01R 13/652* (2013.01)

(58) Field of Classification Search
CPC ............................ H01R 13/10; H01R 13/7036
See application file for complete search history.

(56) References Cited

U.S. PATENT DOCUMENTS 2,177,797 A * 10/1939 Barnitz .................. H01R 13/70
200/51 R
3,644,938 A * 2/1972 Slate ................... H01R 13/633
439/349

(Continued)

FOREIGN PATENT DOCUMENTS

JP 2-150683 U 12/1990
JP 2000-276975 A 10/2000

(Continued)

OTHER PUBLICATIONS

International Search Report of International Application No. PCT/JP2021/033630 issued on Nov. 16, 2021.

(Continued)

*Primary Examiner* — Neil Abrams
(74) *Attorney, Agent, or Firm* — SHINJYU GLOBAL IP

(57) ABSTRACT

A plunger is movable between a first position and a second position. The plunger separates a first movable contact from a first fixed contact and separates a second movable contact from a second fixed contact at the first position. The plunger presses a first movable piece toward a first fixed terminal to make the first movable contact into contact with the first fixed contact, and presses a second movable piece toward a second fixed terminal to make the second movable contact into contact with the second fixed contact at the second position. The plunger moves from the first position to the second position by being pressed by a pressing portion of an electric plug inserted into a third insertion port.

13 Claims, 17 Drawing Sheets

(56) References Cited

U.S. PATENT DOCUMENTS

| | | | | |
|---|---|---|---|---|
| 4,148,536 | A * | 4/1979 | Petropoulsos | H01R 13/7036 200/51.09 |
| 4,649,454 | A | 3/1987 | Winterton | |
| 4,796,159 | A * | 1/1989 | Miksche | H05K 7/1454 361/796 |
| 6,242,706 | B1 | 6/2001 | Miyata | |
| 7,641,489 | B1 * | 1/2010 | Hsu | H01R 13/4538 439/651 |
| 9,059,550 | B2 * | 6/2015 | Beak | H01R 24/70 |
| 10,056,721 | B2 * | 8/2018 | Lin | H01R 13/652 |
| 2013/0199903 | A1 | 8/2013 | Beak et al. | |
| 2013/0206561 | A1 | 8/2013 | Kong et al. | |
| 2023/0411886 | A1 * | 12/2023 | Kobayashi | H01R 13/7032 |

FOREIGN PATENT DOCUMENTS

| | | | |
|---|---|---|---|
| JP | 5575504 | B2 | 8/2014 |
| JP | 2015-187998 | A | 10/2015 |

OTHER PUBLICATIONS

Written Opinion of the International Searching Authority of International Application No. PCT/JP2021/033630 issued on Nov. 16, 2021.

* cited by examiner

POWER CONNECTOR AND POWER OUTLET

CROSS-REFERENCE TO RELATED APPLICATION

This application is the U.S. National Phase of International Application No. PCT/JP2021/033630, filed on Sep. 14, 2021. This application claims priority to Japanese Patent Application No. 2020-207339, filed Dec. 15, 2020. The contents of those applications are incorporated by reference herein in their entireties.

FIELD

The present invention relates to a power connector and a power outlet.

BACKGROUND

In recent years, there has been a demand for a power connector capable of supplying high-voltage and high electric power. For example, there is a demand for a power connector that does not require voltage conversion and is suitable for high-voltage power supply by direct current which has little power loss in power transmission.

Arcing is likely to occur when a high voltage and high electric power is interrupted at the power connector. Therefore, in Japanese Patent Publication No. 5575504, a relay for switching between electrical connection and disconnection between the power source and the power supply terminal is provided inside a power side connector. The power connector of Japanese Patent Publication No. 5575504 includes the power side connector and a device side connector that has a plug shape and is inserted into the power side connector. The power side connector has a mechanical switch member. When the switch member is in the released position, the relay electrically disconnects the power source and the power supply terminal. Even if the device side connector is inserted into the socket of the power side connector, the relay electrically disconnects the power source and the power supply terminal when the switch member is in the released position. When the switch member is switched to the connection position while the device side connector is inserted into the socket of the power side connector, the relay electrically connects the power source and the power supply terminal. Further, a movable member is engaged to the device side connector according to the movement of the switch member to the connection position. This prevents the device side connector from being separated from the power side connector.

SUMMARY

In the power connector described above, when connecting the device side connector to the power side connector, two steps are required: first, the device side connector is inserted into the power side connector, and then the switch member is switched to the connection position. Further, when disconnecting the device side connector from the power side connector, two steps are required: first, the switch member is switched to the released position, and then the device side connector is pulled out from the power side connector. Therefore, the operation of inserting and removing the connector is complicated. It is an object of the present invention to provide a power connector which is easy to operate and can handle a high electric power.

A power connector according to a first aspect of the present invention includes an electric plug and a power outlet. The electric plug includes a first plug terminal, a second plug terminal, and a pressing portion. The power outlet includes a first fixed terminal, a first fixed contact, a second fixed terminal, a second fixed contact, a first movable contact, a first movable piece, a second movable contact, a second movable piece, a socket, a first connection terminal, a second connection terminal, and a plunger. The first fixed contact is connected to the first fixed terminal. The second fixed contact is connected to the second fixed terminal. The first movable contact faces the first fixed contact. The first movable piece is connected to the first movable contact. The second movable contact faces the second fixed contact. The second movable piece is connected to the second movable contact. The socket includes a first insertion port, a second insertion port, and a third insertion port. The first insertion port is configured to allow the first plug terminal to be inserted. The second insertion port is configured to allow the second plug terminal to be inserted. The third insertion port is configured to allow the pressing portion to be inserted. The first connection terminal is disposed in the first insertion port and connected to the first movable piece. The second connection terminal is disposed in the second insertion port and connected to the second movable piece. The plunger is movable between a first position and a second position. The plunger separates the first movable contact from the first fixed contact and separates the second movable contact from the second fixed contact at the first position. At the second position, the plunger presses the first movable piece toward the first fixed terminal to make the first movable contact move into contact with the first fixed contact, and presses the second movable piece toward the second fixed terminal to make the second movable contact move into contact with the second fixed contact. The plunger moves from the first position to the second position by being pressed by the pressing portion of the electric plug inserted into the third insertion port.

In the power connector according to the present aspect, electrical connection and disconnection between the electric plug and the power outlet are switched by opening and closing the first and second movable contacts and the first and second fixed contacts. Thereby, high electric power can be switched appropriately. The electric plug is connected to the power outlet by inserting the first plug terminal into the first insertion port, inserting the second plug terminal into the second insertion port, and inserting the pressing portion into the third insertion port. At that time, the first plug terminal is connected to the first movable piece via the first connection terminal. The second plug terminal is connected to the second movable piece via the second connection terminal. Also, the plunger moves to the second position by being pressed by the pressing portion. Thereby, the first movable contact contacts the first fixed contact, and the second movable contact contacts the second fixed contact. As described above, in the power connector according to the present aspect, the pressing portion presses the plunger in response to an operation of inserting the electric plug into the power outlet and thereby the plunger moves to the second position. Therefore, it is possible to electrically connect the electric plug and the power outlet with a simple operation.

The plunger may reach the second position after the first plug terminal contacts the first connection terminal and the second plug terminal contacts the second connection terminal. In this case, switching of high electric power can be performed more appropriately.

The electric plug may further include a plug ground terminal. The pressing portion may support the plug ground terminal. In this case, the pressing portion has a function of pressing the plunger and a function of supporting the plug ground terminal. The power outlet is thereby miniaturized.

The power outlet may further include a return spring. The return spring may urge the plunger toward the first position. In this case, when the pressing portion is extracted from the third insertion port, the plunger returns to the first position by the pressing force of the return spring. Thereby, the first and second movable contacts separates from the first and second fixed contacts. As a result, the electric plug and the power outlet can be electrically disconnected with a simple operation.

The first movable piece may include a first tip portion, a first base portion, and a first fulcrum. The first tip portion may be connected to the first movable contact. The first fulcrum may be located between the first tip portion and the first base portion. The first movable piece may be swingable around the first fulcrum. The plunger may move the first movable piece away from the first fixed terminal by pressing the first base portion. The plunger may move the first movable piece toward the first fixed terminal by pressing the first tip portion. In this case, the plunger presses the first tip portion by inserting the pressing portion into the third insertion port. As a result, the first movable piece rotates around the first fulcrum, and the first movable contact contacts the first fixed contact. In addition, the plunger presses the first base portion by extracting the pressing portion from the third insertion port. As a result, the first movable piece rotates in the opposite direction around the first fulcrum, and the first movable contact separates from the first fixed contact.

The first connection terminal may include a first receiving portion that supports the first fulcrum. In this case, the first movable piece can be operated with a simple structure. This facilitates miniaturization of the power outlet.

The plunger may face the third insertion port. In this case, the plunger can be pressed by the pressing portion with a simple structure. This facilitates miniaturization of the power outlet.

The plunger may include a plunger body, a first pusher, and a second pusher. The first pusher may protrude from the plunger body toward the first movable piece. The second pusher may protrude from the plunger body toward the second movable piece. In this case, as the plunger moves to the second position, the first pusher presses the first movable piece and the second pusher presses the second movable piece. Thereby, the first movable contact contacts the first fixed contact, and the second movable contact contacts the second fixed contact.

A power outlet according to a second aspect of the present invention is a power outlet for use with an electric plug including a pressing portion. The power outlet according to the second aspect may have the same configuration as the power outlet of the power connector according to the first aspect described above.

DETAILED DESCRIPTION

Figure 1:
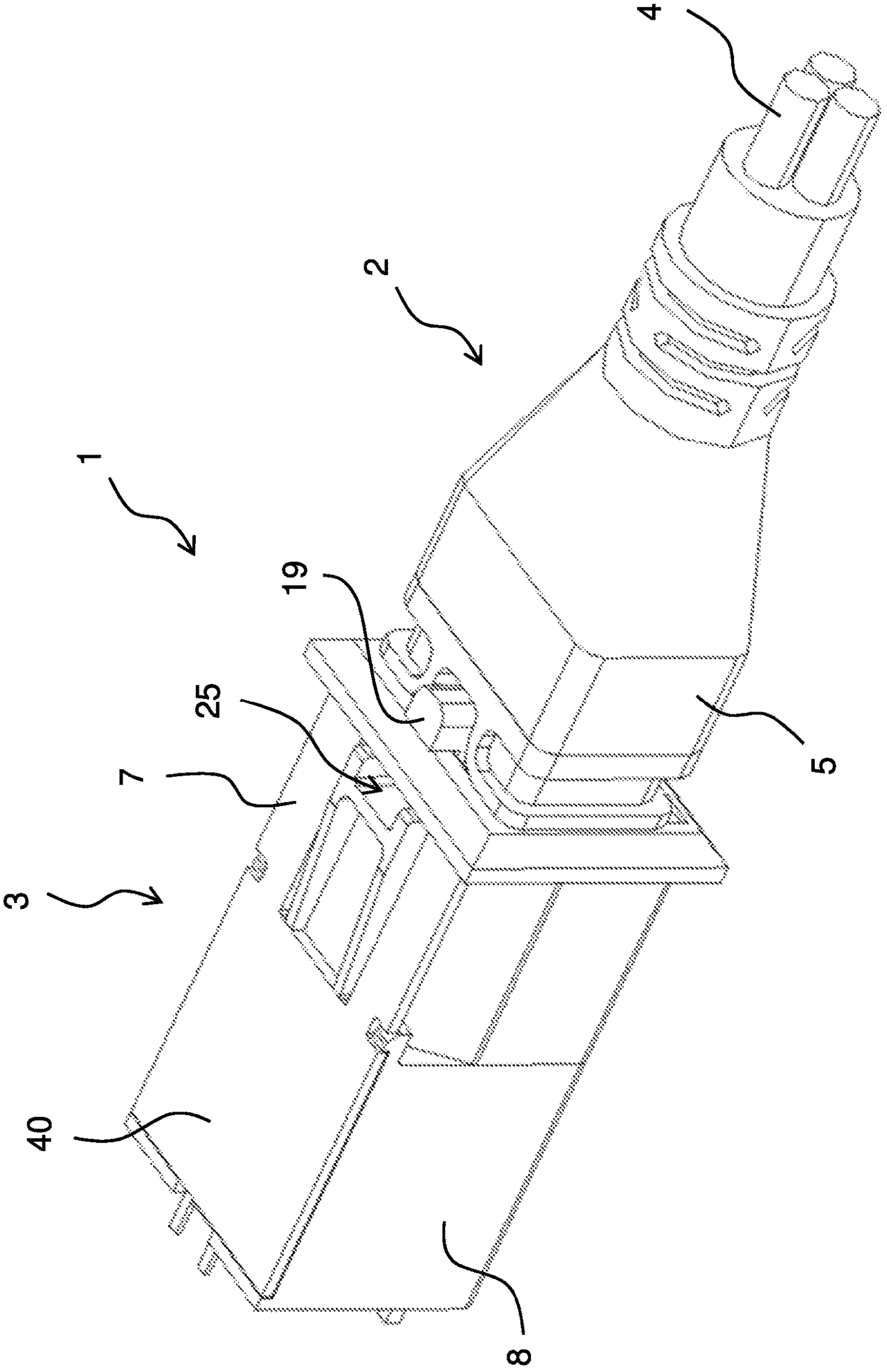
FIG. 1 is a perspective view of a power connector according to an embodiment.
Figure 2:
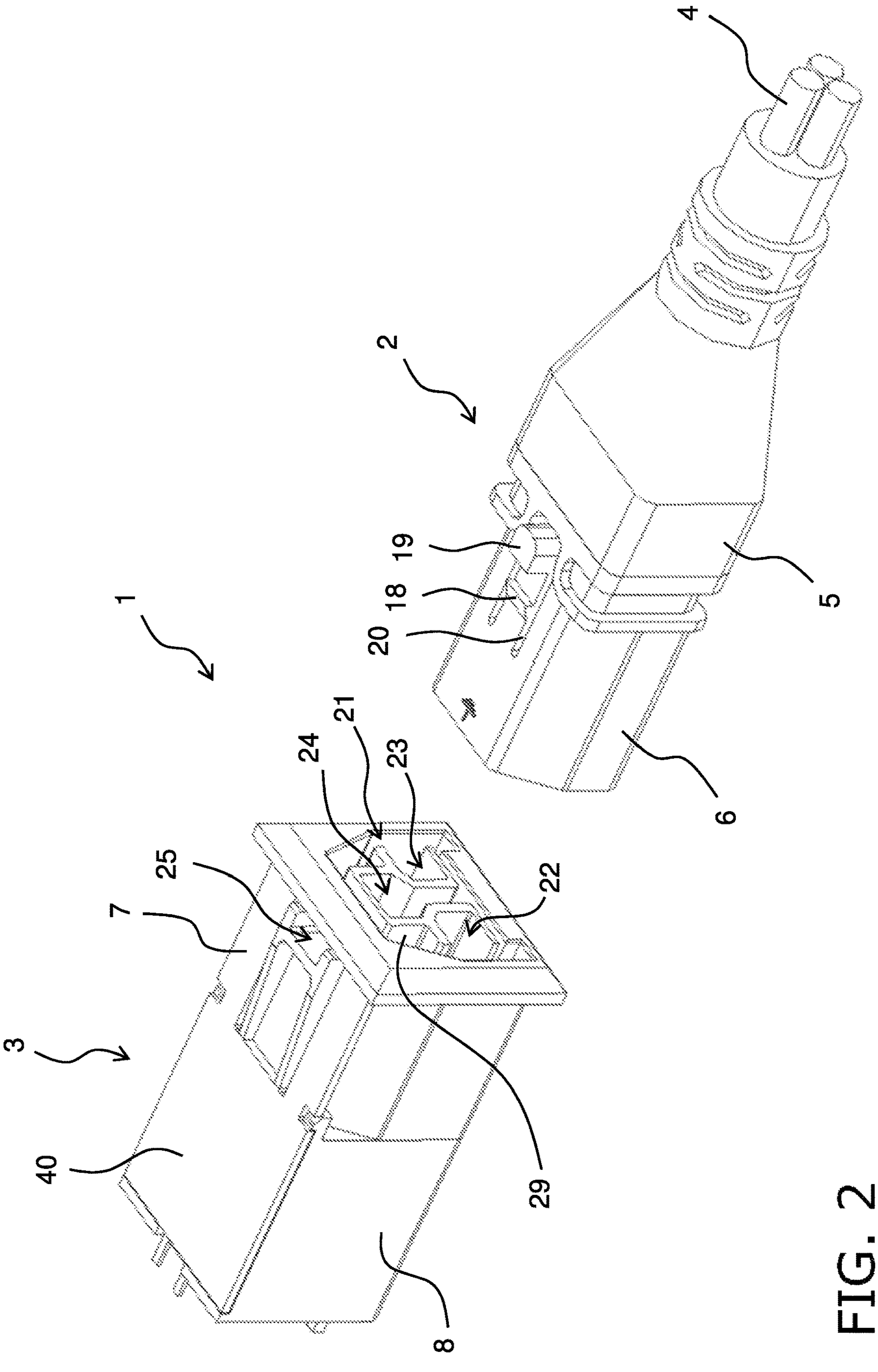
FIG. 2 is an exploded view of the power connector.

Hereinafter, a contact device according to an embodiment and a power connector equipped with the contact device will be described with reference to the drawings. FIG. 1 is a perspective view of a power connector 1 according to an embodiment. FIG. 2 is an exploded view of the power connector 1. The power connector 1 is used to connect a power source and an electrical device. The power connector 1 can be used, for example, for high-current direct current. As shown in FIGS. 1 and 2, the power connector 1 includes an electric plug 2 and a power outlet 3. The electric plug 2 is insertable into the power outlet 3.

Figure 3:
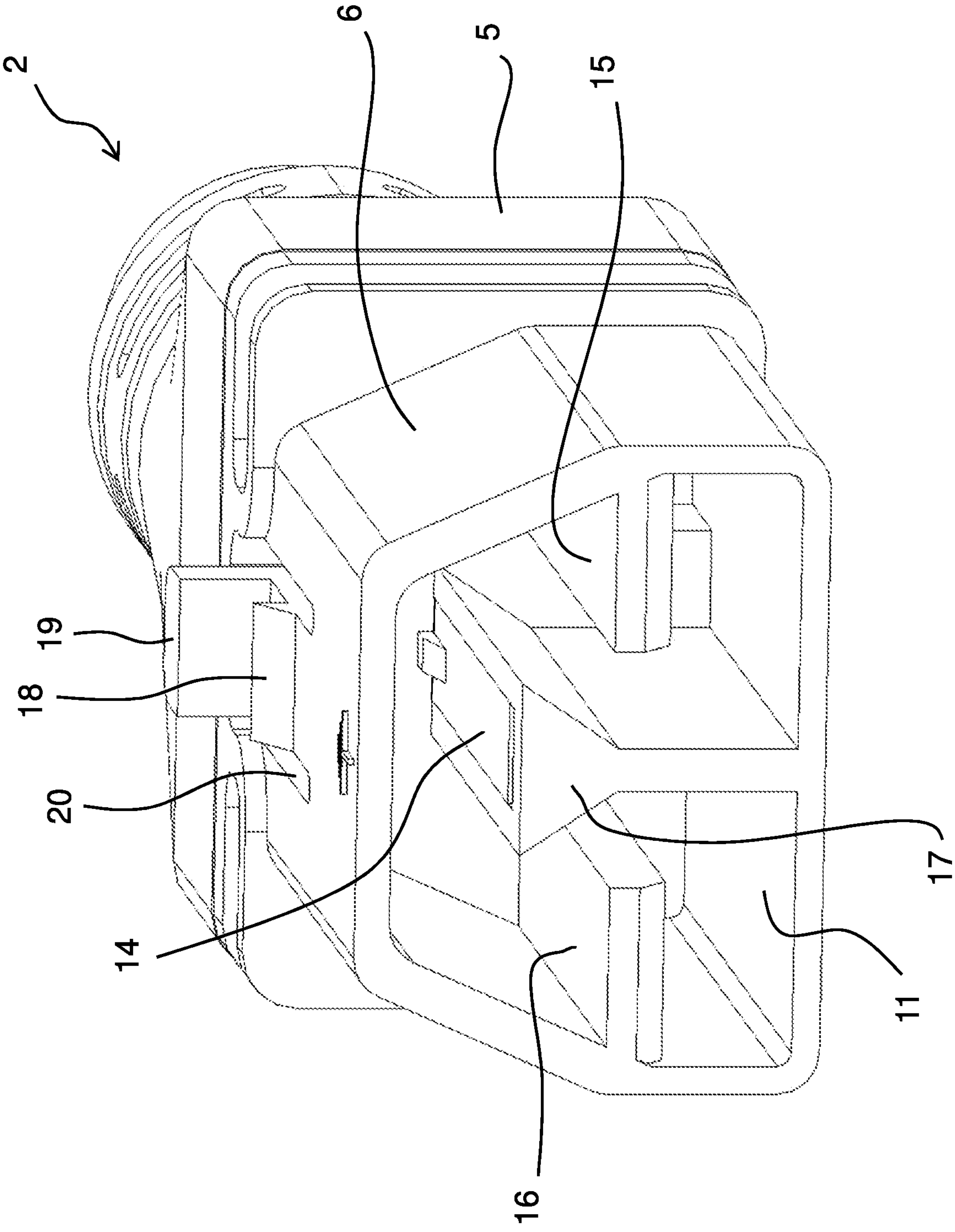
FIG. 3 is a perspective view of an electric plug.
Figure 4:
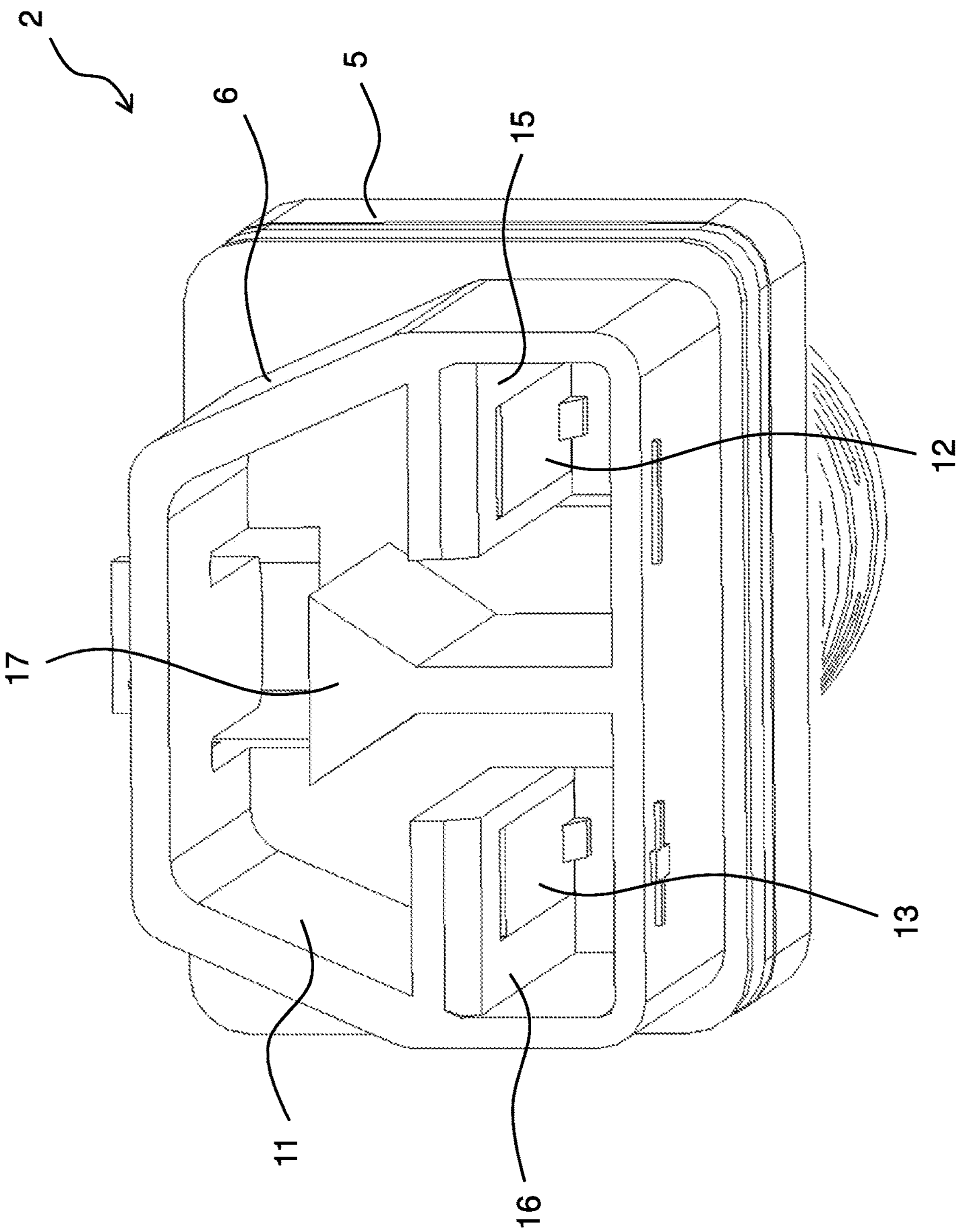
FIG. 4 is a perspective view of the electric plug.

The electric plug 2 is connected to an electrical device. The electric plug 2 includes an electric cable 4, a plug cover 5, and an insert 6. The electric cable 4 extends from the plug cover 5. The insert 6 projects from the plug cover 5. FIGS. 3 and 4 are perspective views of the electric plug 2. As shown in FIGS. 3 and 4, the insert 6 includes a plug hole 11. The plug hole 11 has a shape recessed from the tip of the insert 6. The electric plug 2 includes a first plug terminal 12, a second plug terminal 13, a plug ground terminal 14, a first terminal support portion 15, a second terminal support portion 16, and a pressing portion 17. The first plug terminal 12, the second plug terminal 13, the plug ground terminal 14, the first terminal support portion 15, the second terminal support portion 16, and the pressing portion 17 are disposed in the plug hole 11.

In the present embodiment, a direction in which the electric plug 2 is inserted into and pulled out of the power outlet 3 is defined as a front-rear direction. In particular, a direction from the power outlet 3 to the electric plug 2 is defined as forward, and the opposite direction is defined rearward. A direction in which the first plug terminals 12 and the second plug terminals 13 are aligned is defined as a left-right direction. A direction perpendicular to the front-rear direction and the left-right direction is defined as an up-down direction. In particular, a direction from the first plug terminal 12 and the second plug terminal 13 to the plug ground terminal 14 is defined as upward, and the opposite direction is defined as downward. However, these directions are used for convenience of explanation, and do not limit the directions in which the power connector 1 is used.

The first plug terminal 12, the second plug terminal 13, and the plug ground terminal 14 are connected to the electric cable 4. The first plug terminal 12, the second plug terminal 13, and the plug ground terminal 14 are made of a conductive material such as copper. The first terminal support portion 15, the second terminal support portion 16, and the pressing portion 17 extend in the front-rear direction from the plug cover 5. The first terminal support portion 15 extends along the first plug terminal 12. The first terminal support portion 15 is located above the first plug terminal 12. The first terminal support portion 15 supports the first plug terminal 12. The second terminal support portion 16 extends along the second plug terminal 13. The second terminal support portion 16 is located above the second plug terminal 13. The second terminal support portion 16 supports the second plug terminals 13. The first terminal support portion 15 and the second terminal support portion 16 are disposed apart from each other in the left-right direction.

The plug ground terminal 14 is disposed between the first plug terminal 12 and the second plug terminal 13 in the left-right direction. The plug ground terminal 14 is disposed above the first plug terminal 12 and the second plug terminal 13. The pressing portion 17 extends along the plug ground terminal 14. The pressing portion 17 is located below the plug ground terminal 14. The pressing portion 17 supports the plug ground terminal 14.

As shown in FIG. 2, the power outlet 3 includes a socket 7 and a case 8. The socket 7 extends in the front-rear direction. The socket 7 includes an insertion port 21. The insert 6 of the electric plug 2 is configured to be inserted into the insertion port 21. The insertion port 21 includes a first insertion port 22, a second insertion port 23, and a third insertion port 24. The first plug terminal 12 and the first terminal support portion 15 are configured to be inserted into the first insertion port 22. The second plug terminal 13 and the second terminal support portion 16 is configured to be inserted into the second insertion port 23. The plug ground terminal 14 and the pressing portion 17 are configured to be inserted into the third insertion port 24.

The insert 6 of the electric plug 2 includes a protrusion 18 and a button 19. A slit 20 is provided around the protrusion 18 and the button 19. Thereby, the protrusion 18 and the button 19 are configured to move in the up-down direction. A hole 25 is provided in the upper surface of the socket 7. When the insert 6 is inserted into the insertion port 21 of the socket 7, the protrusion 18 is engaged in the hole 25. Thereby, the electric plug 2 is prevented from coming out of the socket 7. A user presses the button 19 to unlock the protrusion 18 from the hole 25. Thereby, the electric plug 2 can be pulled out from the socket 7.

Figure 5:
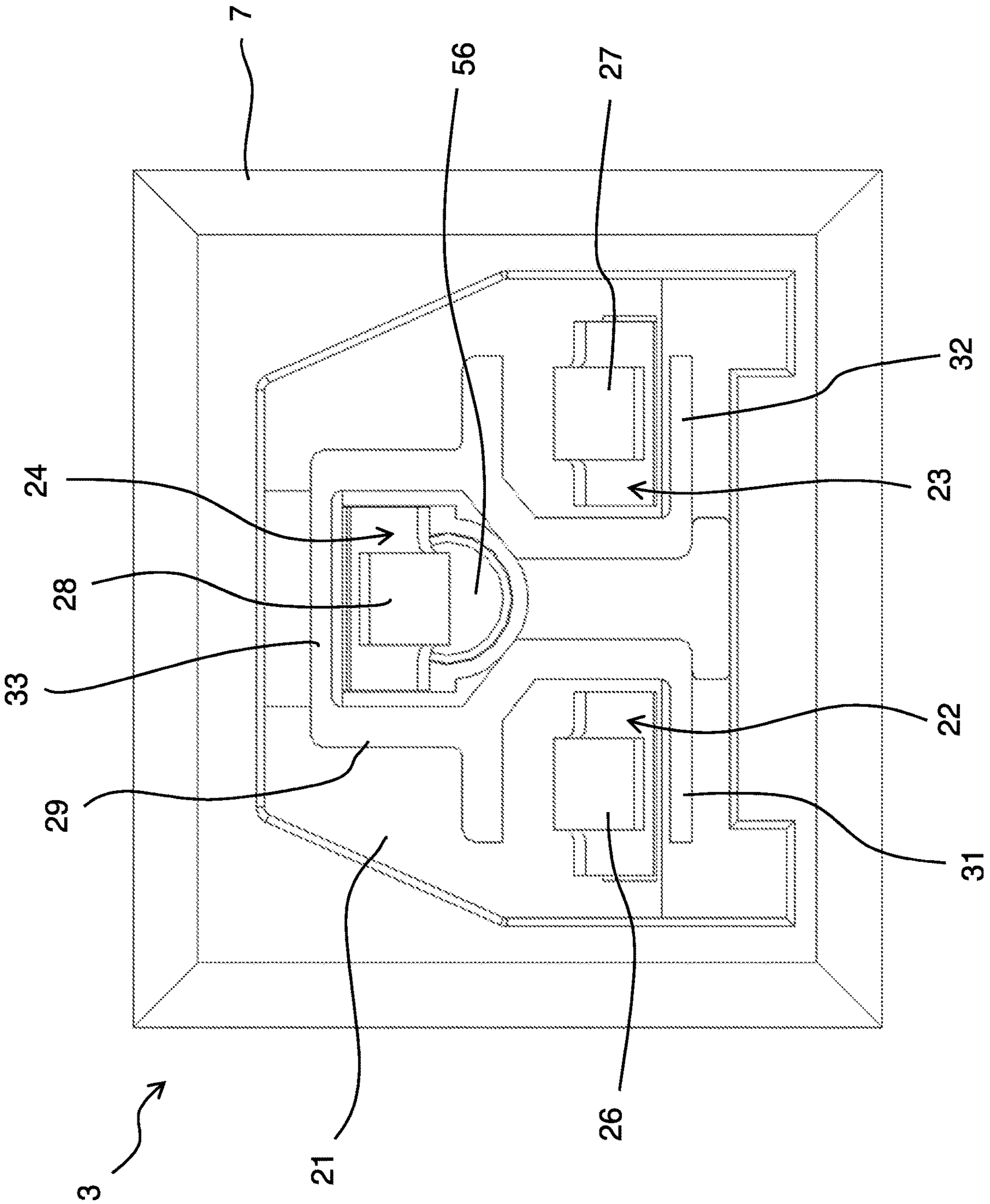
FIG. 5 is a front view of an insertion port of a power outlet.

FIG. 5 is a front view of the insertion port 21. As shown in FIG. 5, the power outlet 3 includes a first connection terminal 26, a second connection terminal 27, and a socket ground terminal 28. The first connection terminal 26, the second connection terminal 27, and the socket ground terminal 28 are made of a conductive material such as copper. The first connection terminal 26 is disposed in the first insertion port 22. The second connection terminal 27 is disposed in the second insertion port 23. The socket ground terminal 28 is disposed in the third insertion port 24.

The Socket 7 includes an inner wall 29. The inner wall 29 is disposed in the insertion port 21. The inner wall 29 extends in the front-rear direction. The first insertion port 22, the second insertion port 23, and the third insertion port 24 are partitioned from each other by the inner wall 29. The inner wall 29 includes a first support portion 31, a second support portion 32, and a third support portion 33. The first support portion 31 is disposed below the first connection terminal 26. The first support portion 31 extends along the first connection terminal 26. The second support portion 32 is disposed below the second connection terminal 27. The second support portion 32 extends along the second connection terminal 27. The third support portion 33 is disposed above the socket ground terminal 28. The third support portion 33 extends along the socket ground terminal 28.

Figure 6:
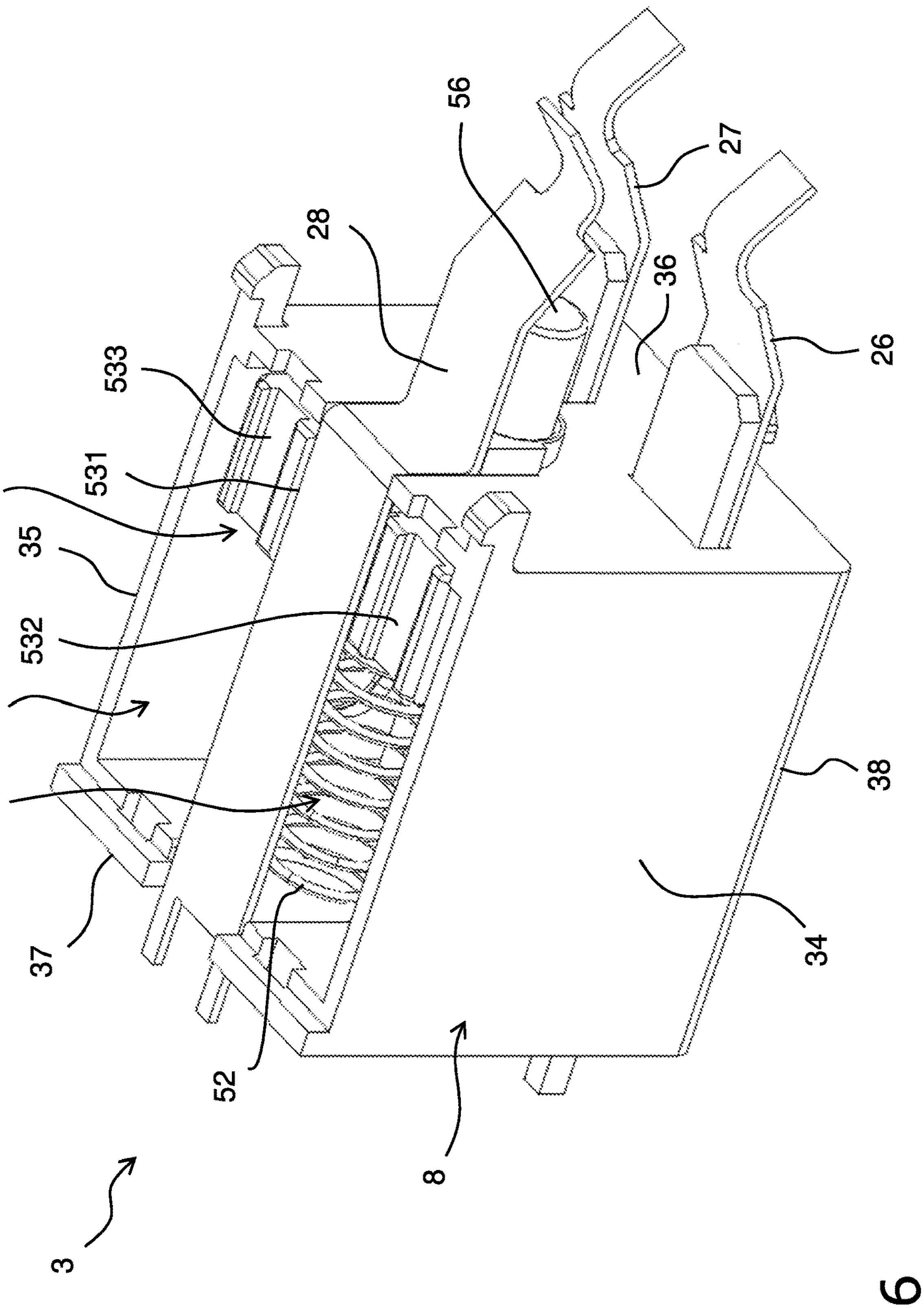
FIG. 6 is a perspective view of the power outlet with a socket removed.

FIG. 6 is a perspective view of the power outlet 3 with the socket 7 removed. As shown in FIG. 6, the first connection terminal 26, the second connection terminal 27, and the socket ground terminal 28 extend forward from the case 8. A rear end of the first connection terminal 26 has a curved shape. A rear end of the second connection terminal 27 has a curved shape. A rear end of the socket ground terminal 28 has a curved shape.

The case 8 includes a first side surface 34, a second side surface 35, a front surface 36, a rear surface 37, and a bottom surface 38. The first side surface 34 and the second side surface 35 are separated from each other in the left-right direction. The front surface 36 and the rear surface 37 are separated from each other in the front-rear direction. The front surface 36 partitions the inside of the socket 7 and the inside of the case 8. The first connection terminal 26, the second connection terminal 27, and the socket ground terminal 28 protrude forward from the rear surface 37. An opening 39 is provided on an upper surface of the case 8. The opening 39 is closed by a lid 40 extending from socket 7.

Figure 7:
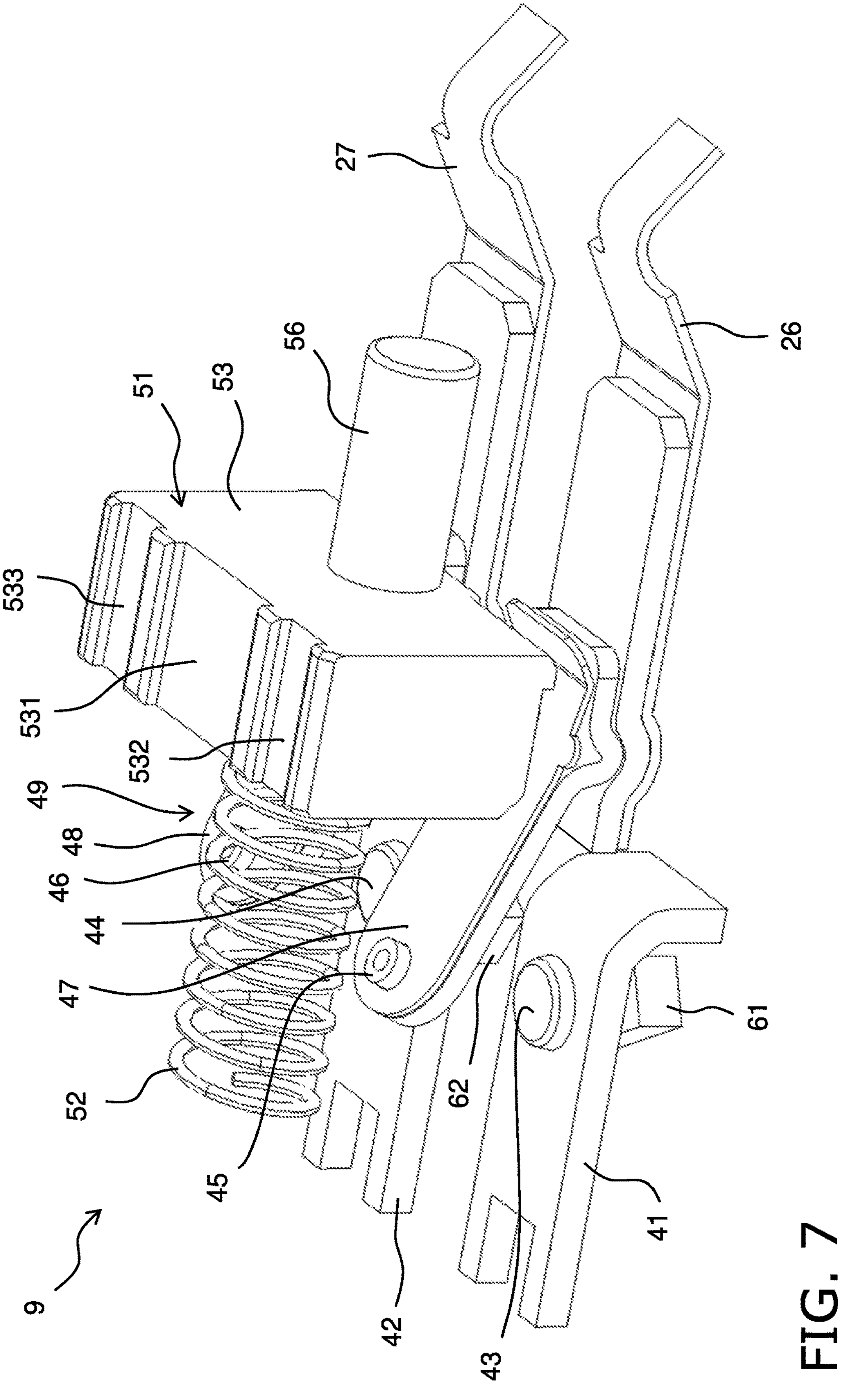
FIG. 7 is a perspective view of a contact device.
Figure 8:
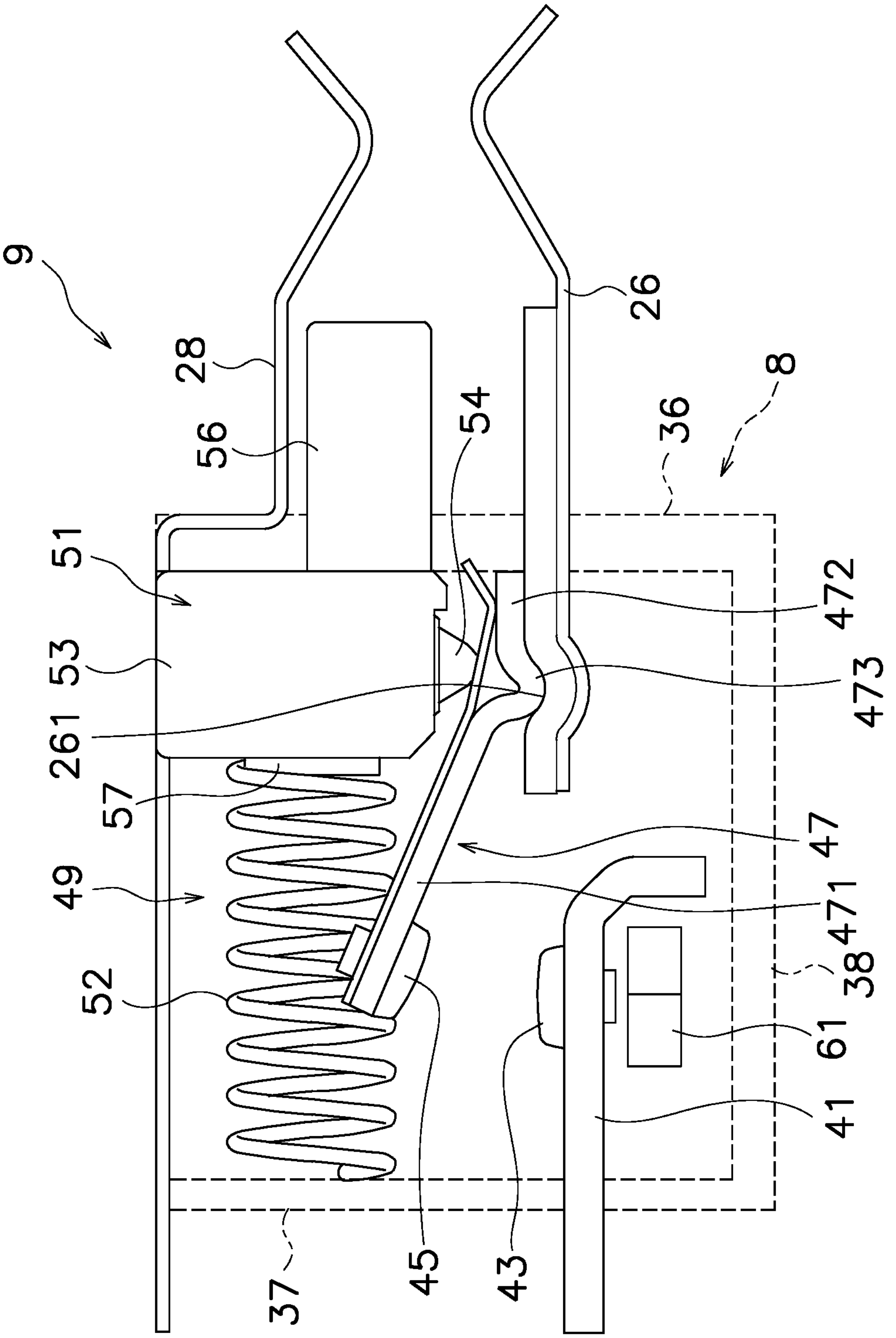
FIG. 8 is a side view of the contact device.

The power outlet 3 includes a contact device 9. The contact device 9 is disposed in the case 8. FIG. 7 is a perspective view of the contact device 9. FIG. 8 is a side view of the contact device 9. The contact device 9 includes a first fixed terminal 41, a second fixed terminal 42, a first fixed contact 43, a second fixed contact 44, a first movable contact 45, a second movable contact 46, a first movable piece 47, a second movable piece 48, and a moving mechanism 49. The first fixed terminal 41 and the second fixed terminal 42 extend in the front-rear direction. The second fixed terminal 42 is disposed apart from the first fixed terminal 41 in the left-right direction. The first fixed contact 43 is connected to the first fixed terminal 41. The second fixed contact 44 is connected to the second fixed terminal 42. The first fixed terminal 41 and the second fixed terminal 42 are made of a conductive material such as copper.

The first movable contact 45 is disposed above the first fixed contact 43. The first movable contact 45 is disposed to face the first fixed contact 43. The second movable contact 46 is disposed above the second fixed contact 44. The second movable contact 46 is disposed to face the second fixed contact 44. The first and second fixed contacts 43 and 44 and the first and second movable contacts 45 and 46 are made of a contact material such as copper alloy or silver alloy.

The first movable piece 47 is connected to the first movable contact 45. The first movable piece 47 extends in the front-rear direction. The first movable piece 47 is disposed above the first connection terminal 26 and the first fixed terminal 41. Specifically, as shown in FIG. 8, the first movable piece 47 includes a first tip portion 471, a first base portion 472, and a first fulcrum 473. The first movable contact 45 is connected to the first tip portion 471. The first tip portion 471 is disposed above the first fixed terminal 41. The first base portion 472 is located behind the first tip portion 471. The first base portion 472 is disposed above the first connection terminal 26. The first fulcrum 473 is disposed between the first tip portion 471 and the first base portion 472. The first fulcrum 473 is connected to the first tip portion 471 and the first base portion 472. The first fulcrum 473 has a downwardly convex curved shape. The first connection terminal 26 includes a first receiving portion 261. The first receiving portion 261 has a downwardly recessed shape. The first receiving portion 261 supports the first fulcrum 473. The first movable piece 47 is swingable around the first fulcrum 473.

Figure 9:
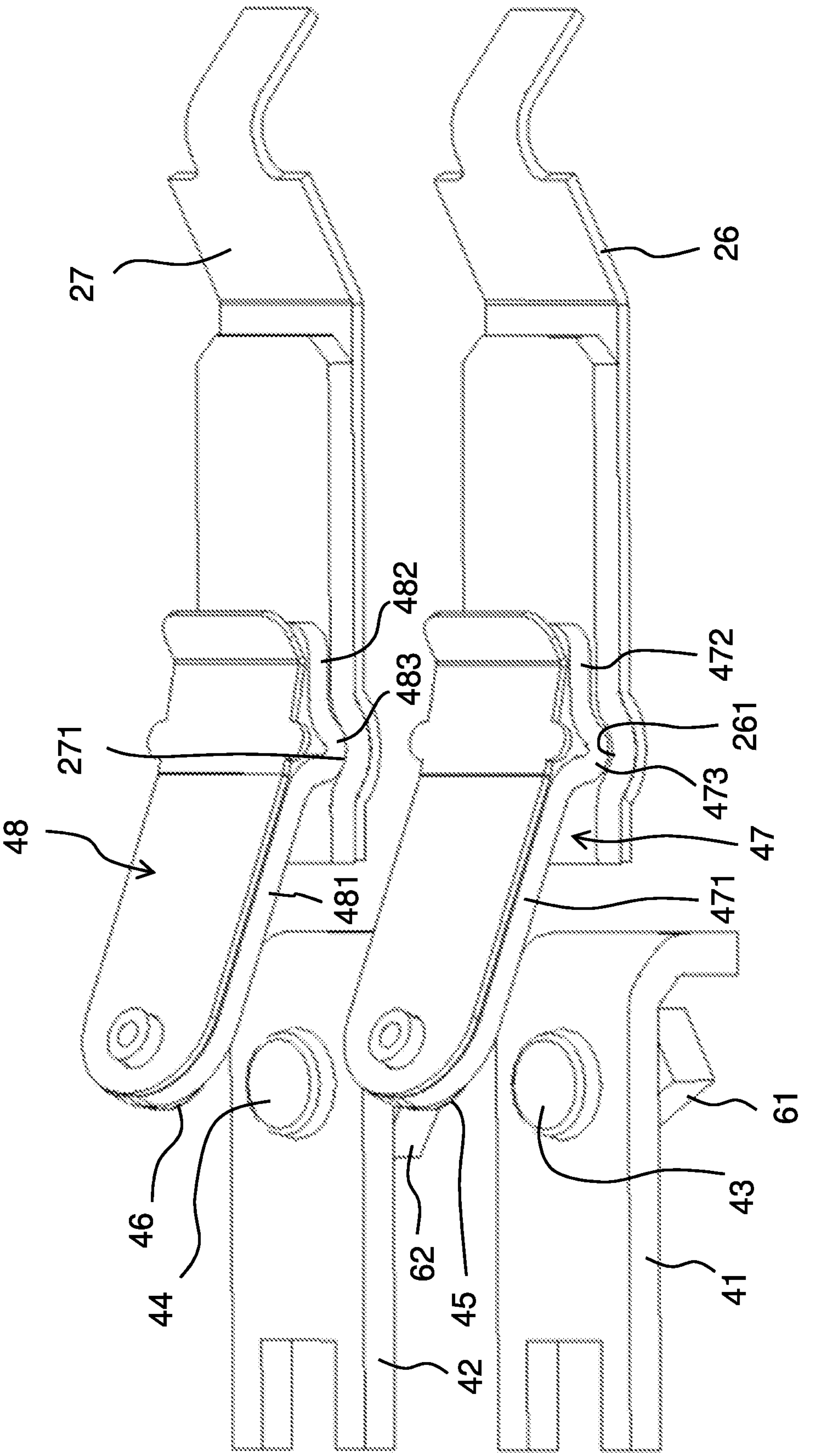
FIG. 9 is a perspective view of the contact device with a moving mechanism omitted.

FIG. 9 is a perspective view of the contact device 9 with the moving mechanism 49 omitted for clarity. As shown in FIG. 9, the second movable piece 48 is disposed apart from the first movable piece 47 in the left-right direction. The second movable piece 48 is connected to the second movable contact 46. The second movable piece 48 extends in the front-rear direction. The second movable piece 48 is disposed above the second connection terminal 27 and the second fixed terminal 42. The first movable piece 47 and the second movable piece 48 are made of a conductive material such as copper. The second movable piece 48 has a structure similar to that of the first movable piece 47. The second movable piece 48 includes a second tip portion 481, a second base portion 482, and a second fulcrum 483. The second tip portion 481, the second base portion 482, and the second fulcrum 483 have the same structures as the first tip portion 471, the first base portion 472, and the first fulcrum 473, respectively. The second connection terminal 27 includes a second receiving portion 271. The second receiving portion 271 has a structure similar to that of the first receiving portion 261. The second movable piece 48 is swingable around the second fulcrum 483.

Figure 10:
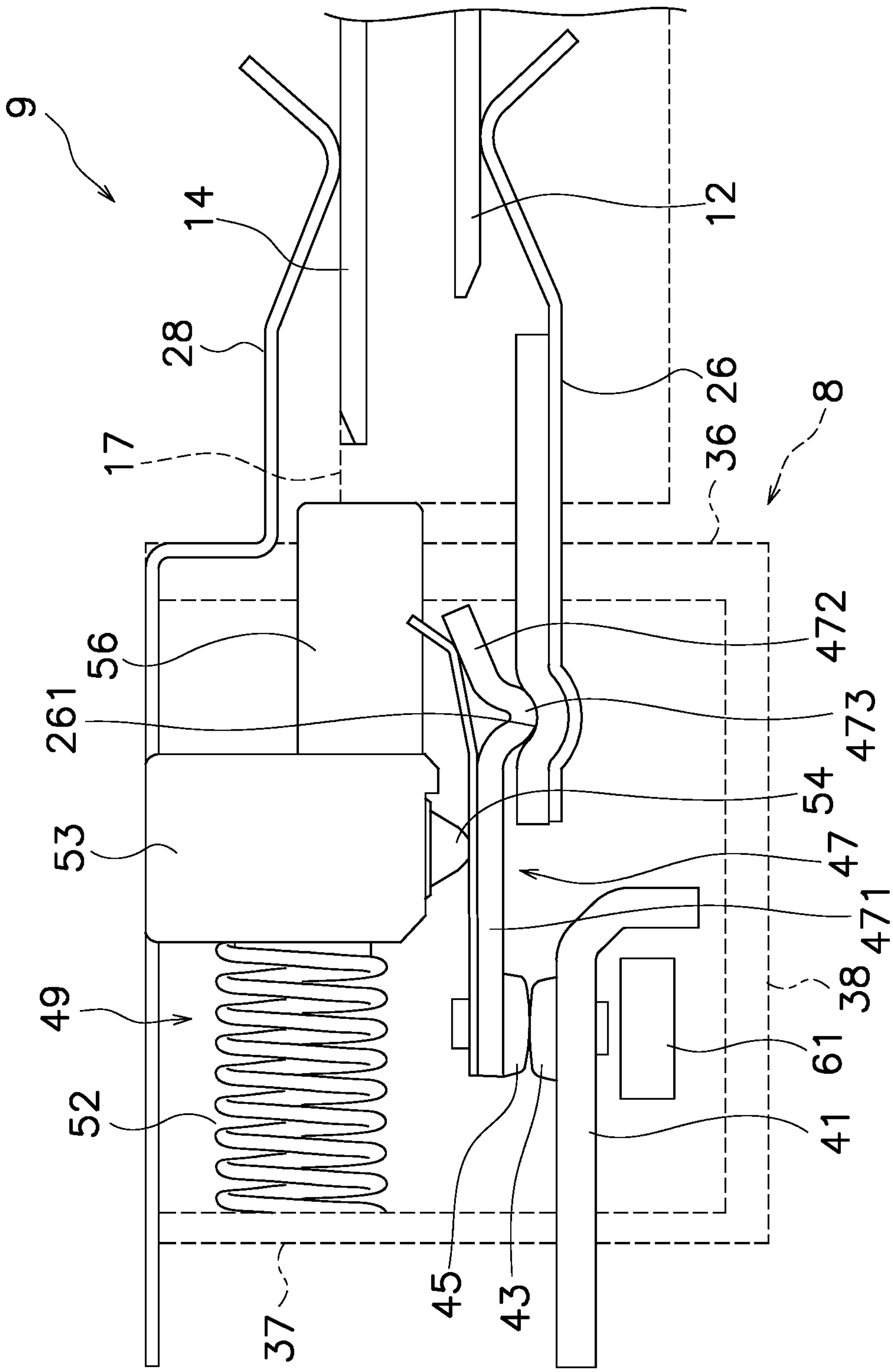
FIG. 10 is a side view of the contact device.

The moving mechanism 49 moves the first movable piece 47 and the second movable piece 48. The moving mechanism 49 is disposed above the first movable piece 47 and the second movable piece 48. As shown in FIG. 7, the moving mechanism 49 includes a plunger 51 and a return spring 52. The plunger 51 is movable in the front-rear direction. The plunger 51 is movable between a first position shown in FIG. 8 and a second position shown in FIG. 10. As shown in FIG. 8, the plunger 51 separates the first movable contact 45 from the first fixed contact 43 and separates the second movable contact 46 from the second fixed contact 44 at the first position. As shown in FIG. 10, the plunger 51 presses the first movable piece 47 toward the first fixed terminal 41 to make the first movable contact 45 move into contact with the first fixed contact 43 and presses the second movable piece 48 toward the second fixed terminal 42 to make the second movable contact 46 move into contact with the second fixed contact 44 at the second position.

Figure 11:
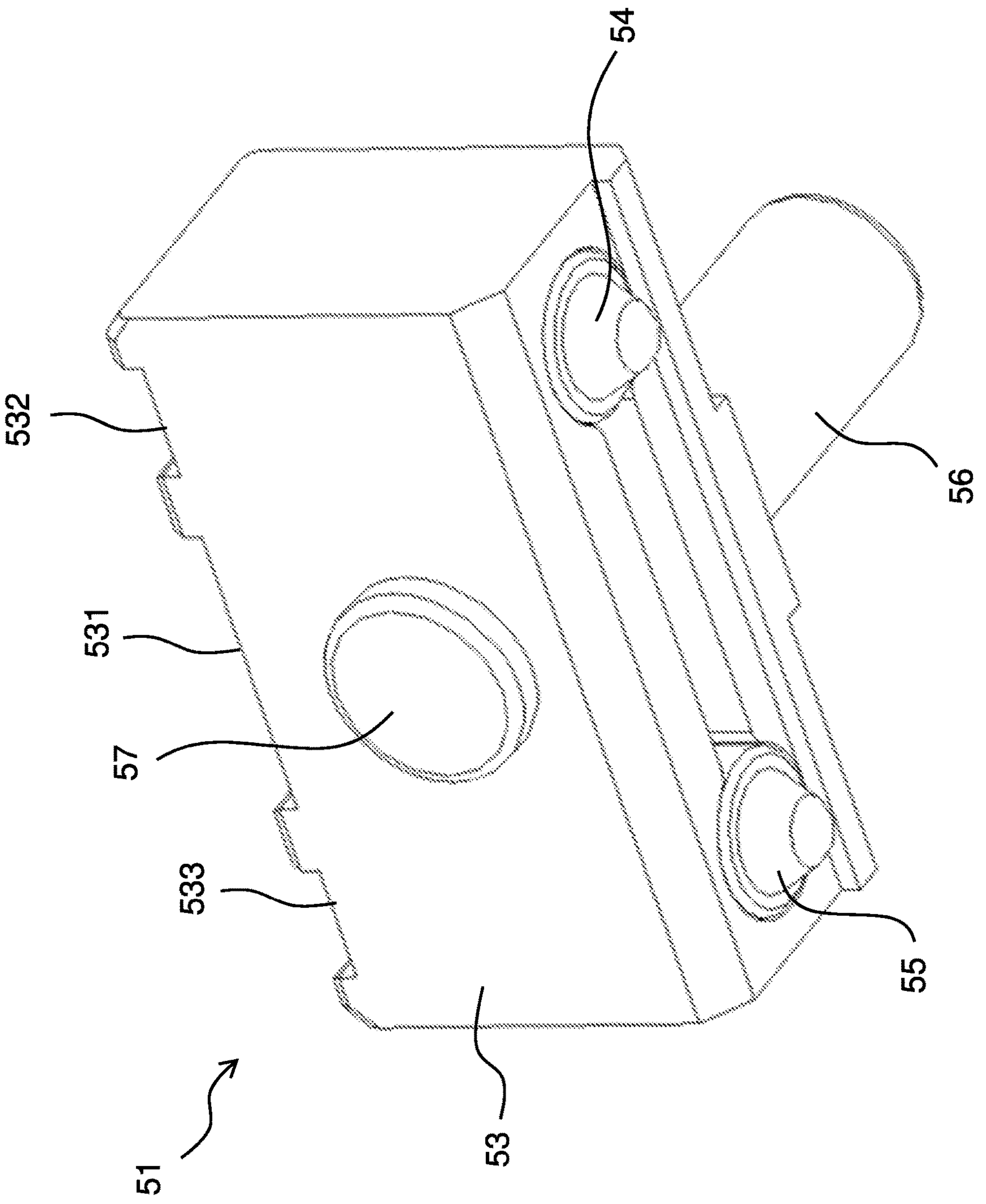
FIG. 11 is a perspective view of a plunger.

FIG. 11 is a perspective view of the plunger 51. As shown in FIG. 11, the plunger 51 includes a plunger body 53, a first pusher 54, a second pusher 55, a projection 56, and a spring mounting portion 57. The plunger body 53 is disposed above the first movable piece 47 and the second movable piece 48. As shown in FIG. 7, the plunger body 53 includes recessed grooves 531 to 533 on its upper surface. The recessed grooves 531 to 533 extend in the front-rear direction. As shown in FIG. 6, the socket ground terminal 28 is disposed in the groove 531. The lid 40 described above includes rail portions 401 and 402 (see FIG. 13). The rail portions 401 and 402 extend in the front-rear direction. The rail portions 401 and 402 are disposed in the grooves 532 and 533. The plunger body 53 moves in the front-rear direction along the rail portions 401 and 402.

As shown in FIG. 11, the first pusher 54 and the second pusher 55 protrude downward from the plunger body 53. The first pusher 54 and the second pusher 55 are disposed apart from each other in the left-right direction. The first pusher 54 protrudes from the plunger body 53 toward the first movable piece 47. The first pusher 54 presses the first movable piece 47. The second pusher 55 protrudes from the plunger body 53 toward the second movable piece 48. The second pusher 55 presses the second movable piece 48.

The projection 56 projects forward from the plunger body 53. As shown in FIG. 6, the projection 56 projects from the front surface 36 of the case 8. As shown in FIG. 5, the protrusion 56 faces the third insertion port 24. A portion of the projection 56 is located below the socket ground terminal 28. The projection 56 is pressed by the pressing portion 17 of the electric plug 2 inserted into the third insertion port 24. The plunger 51 thereby moves from the first position to the second position.

The spring mounting portion 57 protrudes rearward from the plunger body 53. The return spring 52 is attached to the spring mounting portion 57. The return spring 52 presses the plunger 51 toward the first position. That is, the return spring 52 pushes the plunger 51 forward. The return spring 52 is a coil spring. The return spring 52 is disposed between the plunger 51 and the rear surface 37 of the case 8. The return spring 52 is disposed between the first movable piece 47 and the second movable piece 48 in the left-right direction. The return spring 52 is disposed between the first fixed terminal 41 and the second fixed terminal 42 in the left-right direction.

Figure 12:
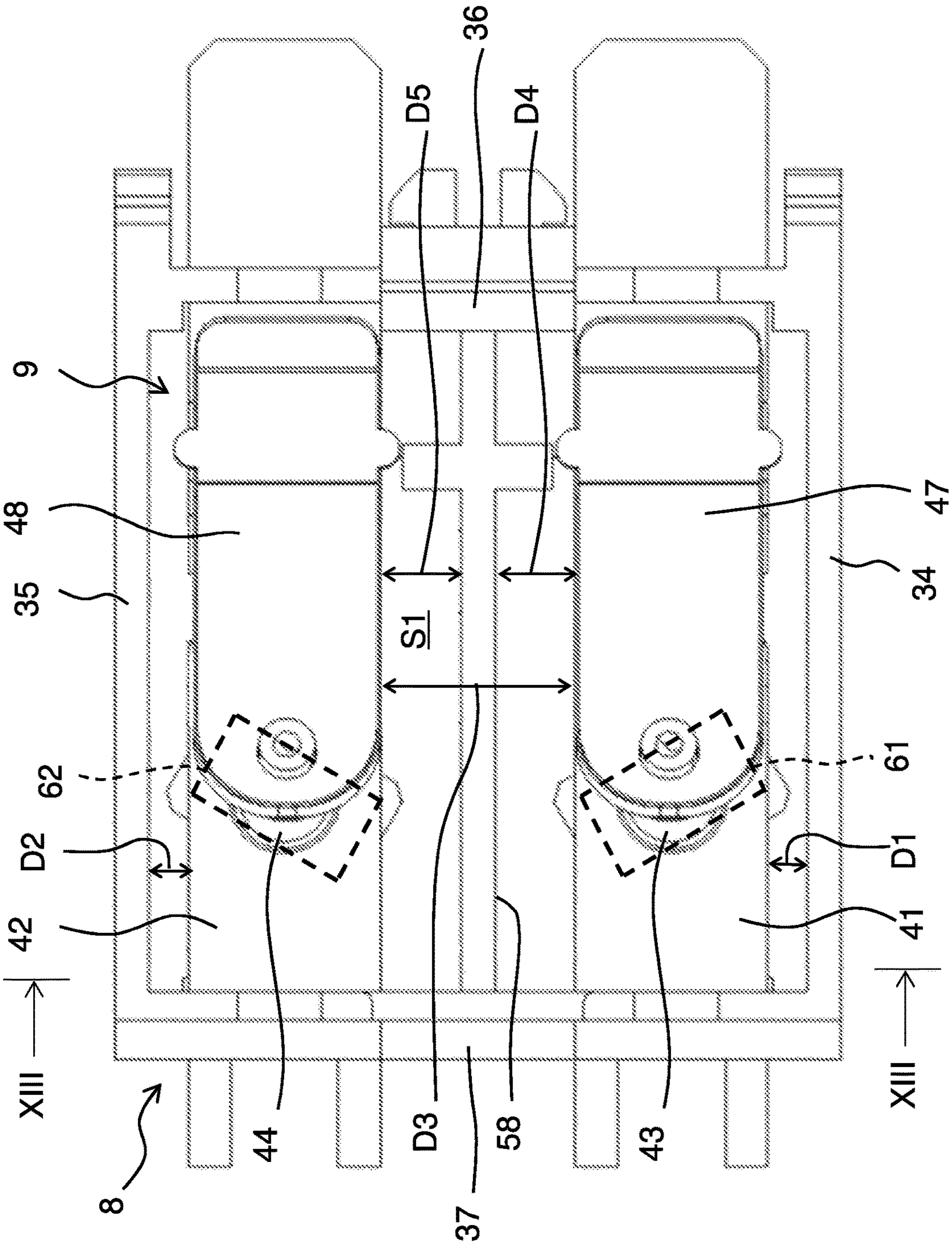
FIG. 12 is a top view of the contact device and a case with the moving mechanism omitted.
Figure 13:
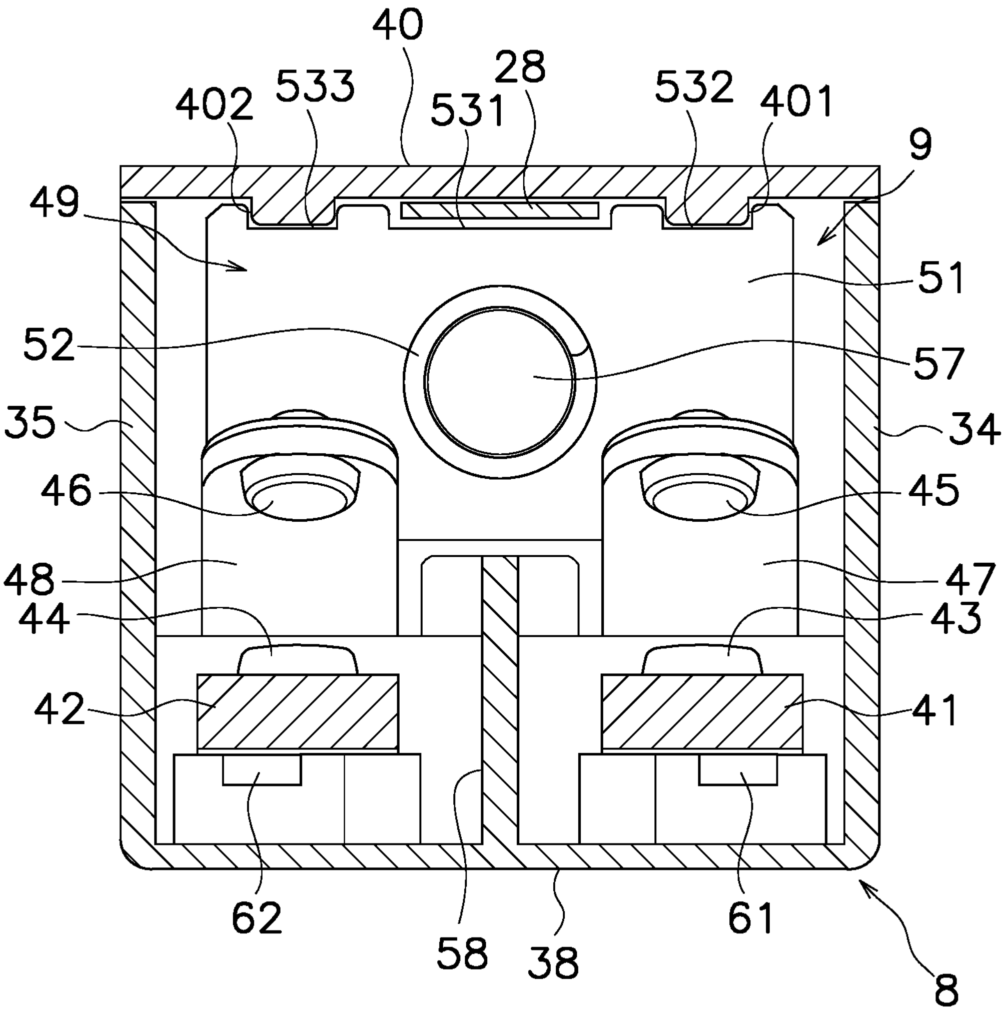
FIG. 13 is a cross-sectional view taken along line XIII-XIII in FIG. 12.

FIG. 12 is a top view showing the contact device 9 and the case 8 with the moving mechanism 49 omitted for clarity. FIG. 13 is a cross-sectional view taken along line XIII-XIII in FIG. 12. As shown in FIGS. 12 and 13, the case 8 includes a partition wall 58. The partition wall 58 protrudes upward from the bottom surface 38. The partition wall 58 is disposed between the first fixed terminal 41 and the second fixed terminal 42. The moving mechanism 49 is disposed above the partition wall 58. The return spring 52 is disposed above the partition wall 58. The plunger 51 moves over the partition wall 58.

The partition wall 58 extends in the front-rear direction. The partition wall 58 spans between the front surface 36 and the rear surface 37 of the case 8. As shown in FIG. 13, an upper end of the partition wall 58 is located above the first fixed terminal 41 and the second fixed terminal 42. The upper end of the partition wall 58 is located above the first fixed contact 43 and the second fixed contact 44. The upper end of the partition wall 58 is located below the plunger 51.

As shown in FIG. 12, the first fixed terminal 41 is disposed close to the first side surface 34. The second fixed terminal 42 is disposed close to the second side surface 35. A distance D1 between the first fixed terminal 41 and the first side surface 34 is smaller than a distance D3 between the first fixed terminal 41 and the second fixed terminal 42. A distance D2 between the second fixed terminal 42 and the second side surface 35 is smaller than the distance D3 between the first fixed terminal 41 and the second fixed terminal 42. The distance D1 between the first fixed terminal 41 and the first side surface 34 is smaller than a distance D4 between the first fixed terminal 41 and the partition wall 58. The distance D2 between the second fixed terminal 42 and the second side surface 35 is smaller than a distance D5 between the second fixed terminal 42 and the partition wall 58.

Next, the connection operation and disconnection operation of the power connector 1 according to the present embodiment will be described. When the electric plug 2 is not inserted into the power outlet 3, the biasing force of the return spring 52 positions the plunger 51 at the first position shown in FIG. 8. In this state, the first pusher 54 presses the first base portion 472 of the first movable piece 47. Also, although not shown, the second pusher 55 presses the second base portion 482 of the second movable piece 48. Therefore, the first movable contact 45 is separated from the first fixed contact 43 and the second movable contact 46 is separated from the second fixed contact 44.

Figure 14:
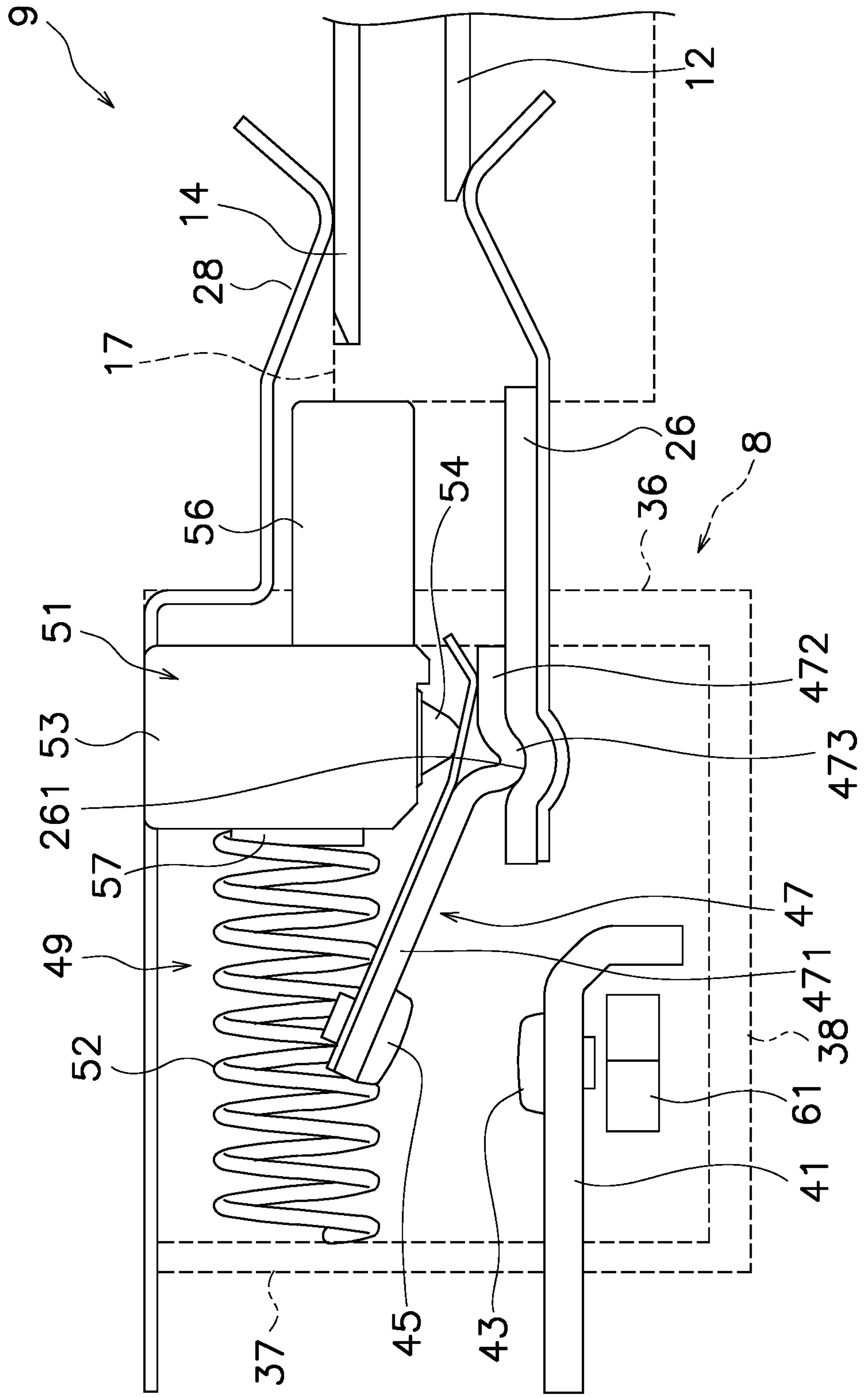
FIG. 14 is a side view of the contact device.

When the insert 6 of the electric plug 2 is inserted into the insertion port 21 of the power outlet 3, the first plug terminal 12 is inserted into the first insertion port 22 and the second plug terminal 13 is inserted into the second insertion port 23. Also, the plug ground terminal 14 is inserted into the third insertion port 24 and the pressing portion 17 is inserted into the third insertion port 24. As shown in FIG. 14, when the pressing portion 17 contacts the projection 56 of the plunger 51, the plug ground terminal 14 is in contact with the socket ground terminal 28. Also, the first plug terminal 12 is in contact with the first connection terminal 26 and the second plug terminal 13 is in contact with the second connection terminal 27. However, the first movable contact 45 is separated from the first fixed contact 43 and the second movable contact 46 is separated from the second fixed contact 44. Therefore, the first movable piece 47 and the first fixed terminal 41 are electrically disconnected. Also, the second movable piece 48 and the second fixed terminal 42 are electrically disconnected.

When the insert 6 of the electric plug 2 is further inserted into the insertion port 21 of the power outlet 3, the pressing portion 17 pushes the plunger 51 rearward to move the plunger 51 toward the second position against the biasing force of the return spring 52. Therefore, as shown in FIG. 10, the first pusher 54 moves from the first base portion 472 of the first movable piece 47 to the first tip portion 471. Thereby, the first pusher 54 pivots around the first fulcrum 473. Also, the second pusher 55 moves from the second base portion 482 of the second movable piece 48 to the second tip portion 481. Thereby, the second pusher 55 pivots around the second fulcrum 483. Then, when the plunger 51 reaches the second position, the first movable contact 45 contacts the first fixed contact 43 and the second movable contact 46 contacts the second fixed contact 44. Thereby, the first plug terminal 12 is electrically connected to the first fixed terminal 41 via the first movable piece 47. Also, the second plug terminal 13 is electrically connected to the second fixed terminal 42 via the second movable piece 48. The electric plug 2 is thereby electrically connected to the power outlet 3.

As described above, when the electric plug 2 is inserted into the power outlet 3, the first movable contact 45 contacts the first fixed contact 43 after the first plug terminal 12 contacts the first connection terminal 26. Also, the second movable contact 46 contacts the second fixed contact 44 after the second plug terminal 13 contacts the second connection terminal 27.

When the insert 6 of the electric plug 2 is pulled out from the insertion port 21 of the power outlet 3, the pressing portion 17 moves forward. Accordingly, the plunger 51 moves toward the first position by the biasing force of the return spring 52. Therefore, as shown in FIG. 14, the first pusher 54 moves from the first tip portion 471 of the first movable piece 47 to the first base portion 472. Thereby, the first pusher 54 pivots around the first fulcrum 473 in the opposite direction to when the plunger 51 moves toward the second position. Also, the second pusher 55 moves from the second tip portion 481 of the second movable piece 48 to the second base portion 482. Thereby, the second pusher 55 pivots around the second fulcrum 483 in the opposite direction to when the plunger 51 moves toward the second position. Then, when the plunger 51 reaches the first position, the first movable contact 45 separates from the first fixed contact 43 and the second movable contact 46 separates from the second fixed contact 44. Thereby, the first movable piece 47 is electrically disconnected from the first fixed terminal 41. Also, the second movable piece 48 is electrically disconnected from the second fixed terminal 42.

When the pressing portion 17 moves further forward, the pressing portion 17 of the electric plug 2 separates from the projection 56 of the plunger 51. Also, the first plug terminal 12 separates from the first connection terminal 26 and the second plug terminal 13 separates from the second connection terminal 27. Thereby, the electric plug 2 is electrically disconnected from the power outlet 3. As described above, when the electric plug 2 is pulled out from the power outlet 3, the first plug terminal 12 separates from the first connection terminal 26 after the first movable contact 45 separates from the first fixed contact 43. Also, the second plug terminal 13 separates from the second connection terminal 27 after the second movable contact 46 separates from the second fixed contact 44.

As described above, in the power connector 1 according to the present embodiment, electrical connection and disconnection between the electric plug 2 and the power outlet 3 are switched by opening and closing the first and second movable contacts 45 and 46 and the first and second fixed contacts 43 and 44. Thereby, high electric power can be switched appropriately.

Further, in the power connector 1 according to the present aspect, the pressing portion 17 presses the plunger 51 according to the operation of inserting the electric plug 2 into the power outlet 3. The plunger 51 is thereby moved to the second position. Therefore, the electric plug 2 and the power outlet 3 can be electrically connected with a simple operation.

Next, a structure for extinguishing an arc in the contact device 9 according to the present embodiment will be described. As shown in FIG. 12, the contact device 9 includes a first magnet 61 and a second magnet 62. The first magnet 61 is disposed below the first fixed terminal 41. The first magnet 61 is disposed below the first fixed contact 43. As seen in the top view, the first magnet 61 overlaps the first fixed contact 43. The first magnet 61 has a rectangular parallelepiped shape. The second magnet 62 is disposed below the second fixed terminal 42. The second magnet 62 is disposed below the second fixed contact 44. The second magnet 62 overlaps the second fixed contact 44 as seen in the top view. The second magnet 62 has a rectangular parallelepiped shape.

Figure 15:
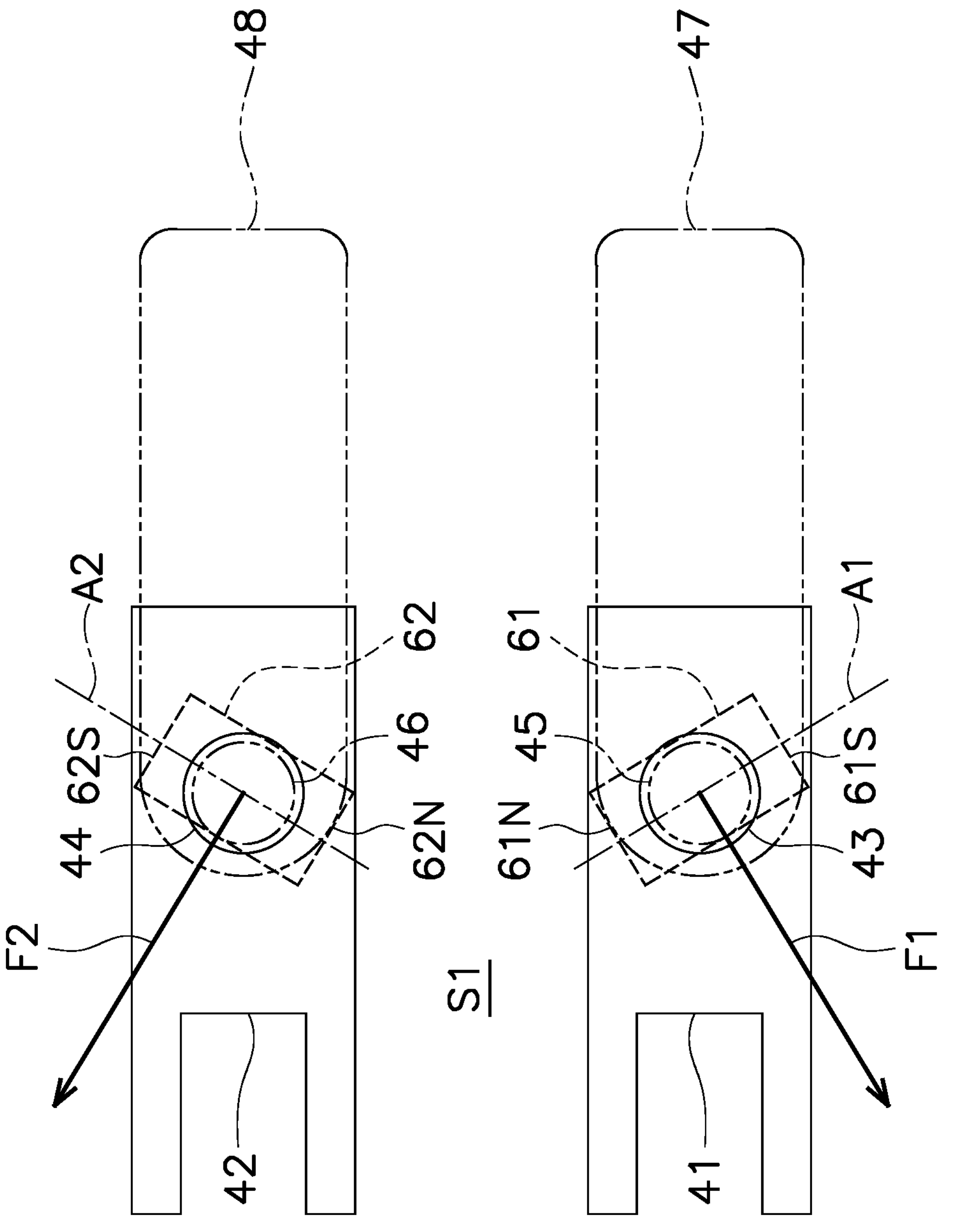
FIG. 15 is a schematic top view of the contact device showing an arrangement of a first magnet and a second magnet.

FIG. 15 is a schematic top view of the contact device 9 showing the arrangement of the first magnet 61 and the second magnet 62. As shown in FIG. 15, the first magnet 61 has a first axis A1. The first axis A1 is a virtual line connecting the N pole 61N and the S pole 61S of the first magnet 61. The first axis A1 is inclined with respect to the front-rear direction and the left-right direction. The second magnet 62 has a second axis A2. The second axis A2 is a virtual line connecting the N pole 62N and the S pole 62S of the second magnet 62. The second axis A2 is inclined with respect to the front-rear direction and the left-right direction. The second axis A2 is inclined symmetrically with the first axis A1.

The first magnet 61 generates a magnetic field that applies a first Lorentz force F1 in a first oblique direction to an arc generated between the first fixed contact 43 and the first movable contact 45. The first oblique direction is a direction inclined with respect to the front-rear direction and away from the second fixed terminal 42. Specifically, the first magnet 61 generates the first Lorentz force F1 directed rearward and outward in the left-right direction.

The second magnet 62 generates a magnetic field that applies a second Lorentz force F2 in a second oblique direction to an arc generated at the second fixed contact 44 and the second movable contact 46. The second oblique direction is a direction inclined with respect to the front-rear direction and away from the first fixed terminal 41. The second magnet 62 generates the second Lorentz force F2 directed rearward and outward in the left-right direction.

As described above, in the contact device 9 according to the present embodiment, The Lorentz forces act on the arcs in the directions away from the space S1 (hereinafter referred to as the central space) between the first fixed terminal 41 and the second fixed terminal 42, respectively. Therefore, even if an airflow flowing toward the central space S1 is generated due to the temperature difference due to the heat of the arc, the movement of the arc toward the central space S1 is suppressed. Thereby, occurrence of a short circuit between the first fixed terminal 41 and the second fixed terminal 42 is suppressed. Also, the first oblique direction and the second oblique direction are inclined with respect to the front-rear direction. Therefore, it is possible to extend the arcs using the space along the first fixed contact 43 and the space along the second fixed contact 44 compared with the case where the first and second Lorentz forces F1 and F2 act outward in the left-right direction respectively. Thereby, the arc can be extinguished effectively. In addition, although the first side surface 34 and the second side surface 35 are disposed close to the first fixed terminal 41 and the second fixed terminal 42, the arc is obliquely extended, so that damage to the first side surface 34 and the second side surface 35 is suppressed. Thereby, the enlargement of the contact device 9 is suppressed.

Although one embodiment of the present invention has been described above, the present invention is not limited to the above-described embodiment, and various modifications are possible without departing from the scope of the invention.

The structure of the moving mechanism 49 is not limited to that of the above embodiment, and may be modified. For example, the shape or movement of the plunger 51 may be changed. The structure of the return spring 52 may be changed. Before the pressing portion 17 contacts the projection 56 of the plunger 51, the plug ground terminal 14 may contact the socket ground terminal 28, the first plug terminal 12 may contact the first connection terminal 26, and the second plug terminal 13 may contact the second connection terminal 27. Alternatively, after the pressing portion 17 contacts the projection 56 of the plunger 51, the plug ground terminal 14 may contact the socket ground terminal 28, the first plug terminal 12 may contact the first connection terminal 26, and the second plug terminal 13 may contact the second connection terminal 27.

The structure of the magnet is not limited to that of the above embodiment, and may be modified. Alternatively, the magnet may be omitted. The structure of the case 8 is not limited to that of the above embodiment, and may be modified. For example, the partition wall 58 may be omitted.

Figure 16:
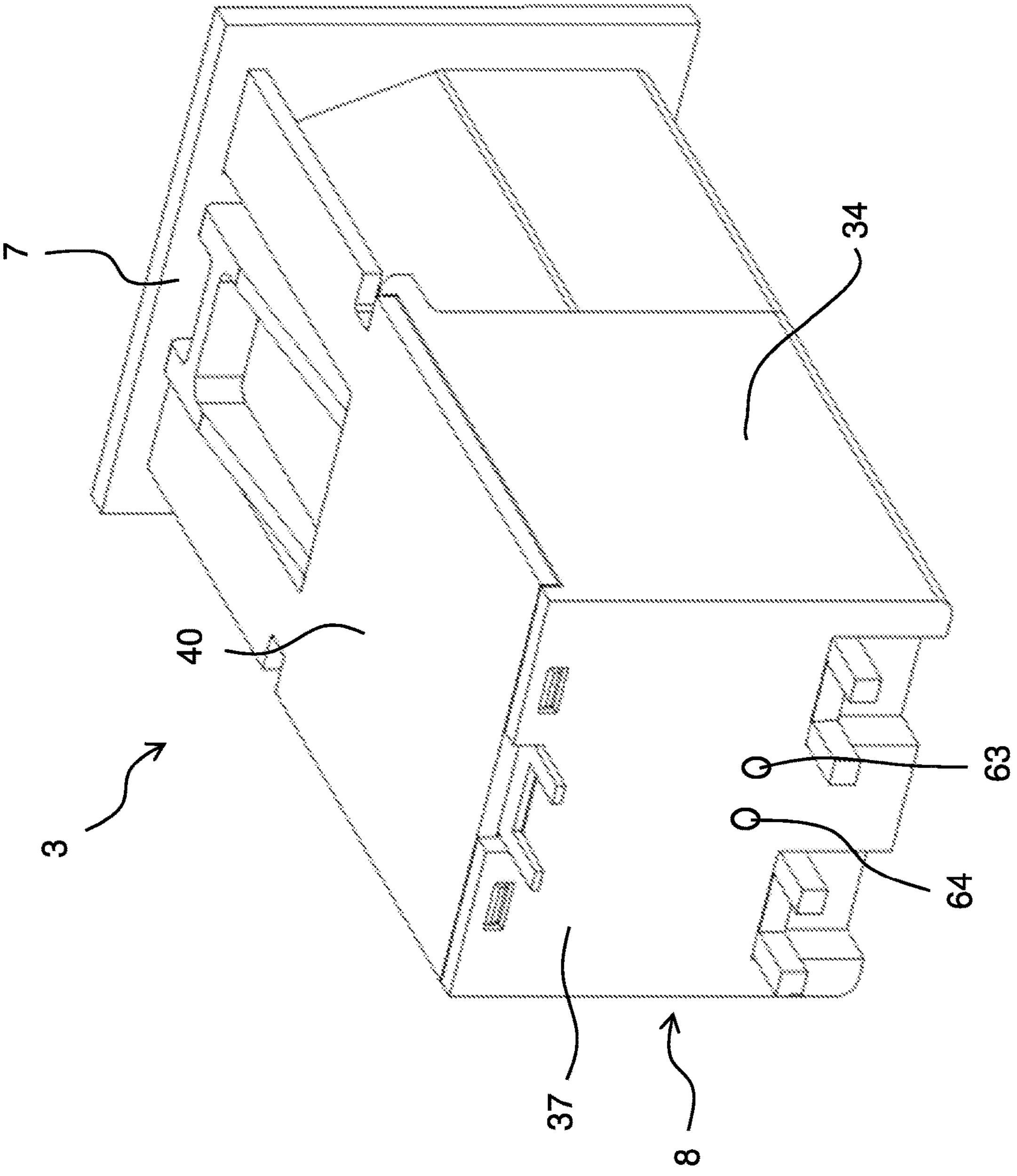
FIG. 16 is a perspective view of the power outlet according to a modification.
Figure 17:
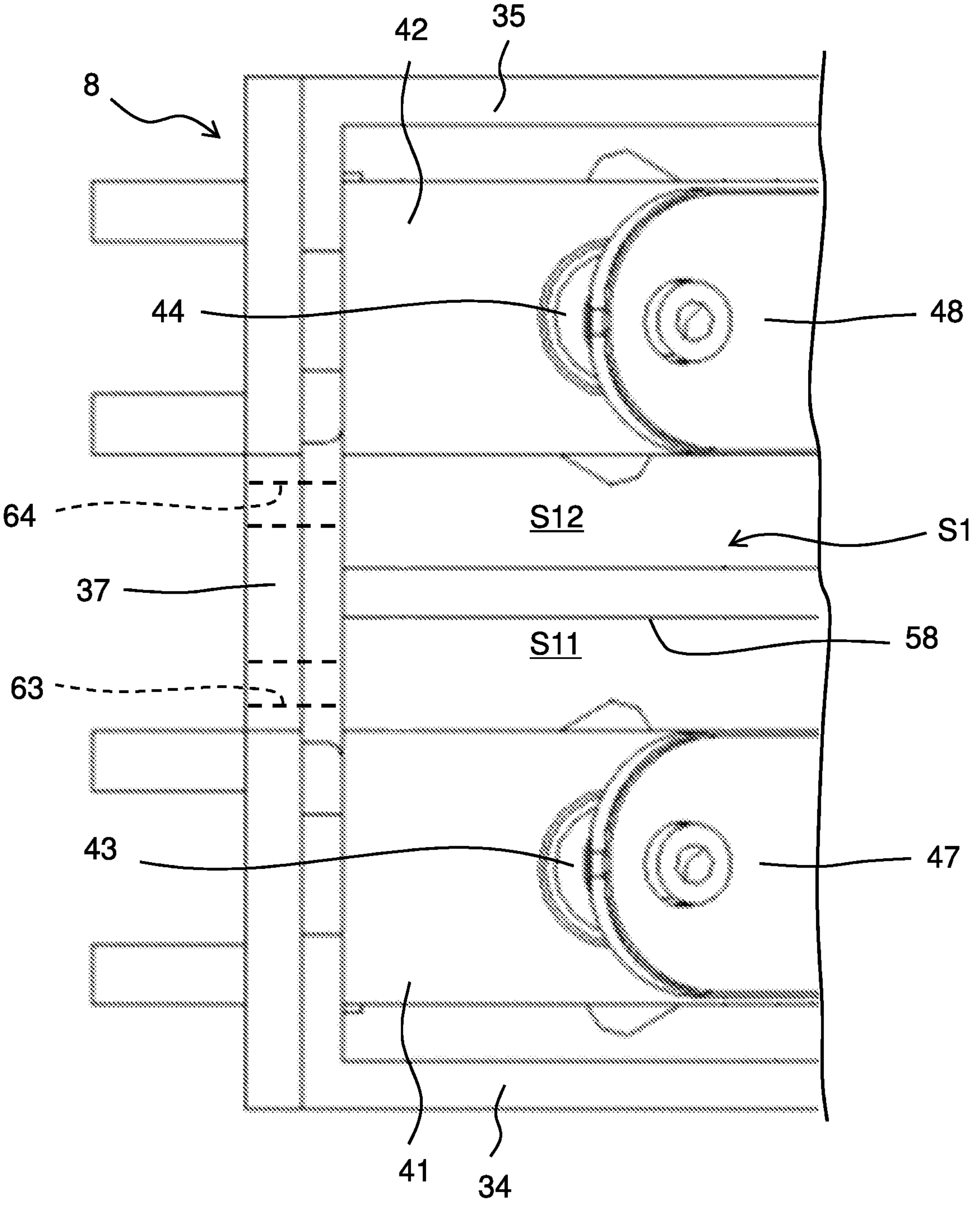
FIG. 17 is a top view of the contact device of the power outlet according to the modification.

FIG. 16 is a perspective view showing the power outlet 3 according to a modification. FIG. 17 is a top view of the contact device 9 of the power outlet 3 according to the modification. As shown in FIGS. 16 and 17, the case 8 may include air holes 63 and 64 disposed facing the central space S1. The air holes 63 and 64 may communicate the outside of the case 8 and the central space S1. The air holes 63 and 64 may be provided in the rear surface 37 of the case 8. The air holes 63 and 64 may include a first hole 63 and a second hole 64. The first hole 63 may be disposed to face a first central space S11 between the first fixed terminal 41 and the partition wall 58. The second hole 64 may be disposed to face a second central space S12 between the second fixed terminal 42 and the partition wall 58. In this case, even if the air in the first and second central spaces S11 and S12 is warmed by the arc, the air can escape to the outside of the case 8 through the first hole 63 and the second hole 64. This suppresses the movement of the arc toward the central space S1.

REFERENCE SIGNS LIST

2 Electric plug
3 Power outlet
7 Socket
12 First plug terminal
13 Second plug terminal
14 Plug ground terminal
17 Pressing portion
22 First insertion port
23 Second insertion port
24 Third insertion port
26 First connection terminal
27 Second connection terminal
41 First fixed terminal
42 Second fixed terminal
43 First fixed contact
44 Second fixed contact
45 First movable contact
46 Second movable contact
47 First movable piece
48 Second movable piece
51 Plunger
52 Return spring
53 Plunger body
54 First pusher
55 Second pusher
261 First receiving portion
471 First tip portion
472 First base portion
473 First fulcrum

The invention claimed is:

1. A power connector comprising:

an electric plug including a first plug terminal, a second plug terminal, a plug ground terminal, a pressing portion, a first terminal support portion, a second terminal support portion, and a plug hole, the plug ground terminal, the pressing portion, the first terminal support portion, the second terminal support portion being disposed in the plug hole, the pressing portion being disposed below the plug ground terminal and supporting the plug ground terminal from below, the first terminal support portion being disposed above the first plug terminal and supporting the first plug terminal from above, the second terminal support portion being disposed above the second plug terminal and supporting the second plug terminal from above; and a power outlet including a first fixed terminal, a first fixed contact connected to the first fixed terminal, a second fixed terminal, a second fixed contact connected to the second fixed terminal, a first movable contact facing the first fixed contact, a first movable piece connected to the first movable contact, a second movable contact facing the second fixed contact, a second movable piece connected to the second movable contact, a socket including a first insertion port configured to allow the first plug terminal to be inserted, a second insertion port configured to allow the second plug terminal to be inserted, and a third insertion port configured to allow the pressing portion to be inserted, a first connection terminal disposed in the first insertion port, the first connection terminal being connected to the first movable piece, a second connection terminal disposed in the second insertion port, the second connection terminal being connected to the second movable piece, and a plunger movable between a first position and a second position, the plunger being configured to separate the first movable contact from the first fixed contact and separate the second movable contact from the second fixed contact at the first position, the plunger being configured to press the first movable piece toward the first fixed terminal to make the first movable contact move into contact with the first fixed contact and press the second movable piece toward the second fixed terminal to make the second movable contact move into contact with the second fixed contact at the second position, the plunger being configured to move from the first position to the second position by being pressed by the pressing portion of the electric plug inserted into the third insertion port.

2. The power connector according to claim 1, wherein the plunger is configured to reach the second position after the first plug terminal contacts the first connection terminal and the second plug terminal contacts the second connection terminal.

3. The power connector according to claim 1, wherein the electric plug further includes a plug ground terminal, and the pressing portion supports the plug ground terminal.

4. The power connector according to claim 1, wherein the power outlet further includes a return spring configured to bias the plunger toward the first position.

5. A power connector comprising:

an electric plug including a first plug terminal, a second plug terminal, and a pressing portion; and a power outlet including a first fixed terminal, a first fixed contact connected to the first fixed terminal, a second fixed terminal, a second fixed contact connected to the second fixed terminal, a first movable contact facing the first fixed contact, a first movable piece connected to the first movable contact, a second movable contact facing the second fixed contact, a second movable piece connected to the second movable contact, a socket including a first insertion port configured to allow the first plug terminal to be inserted, a second insertion port configured to allow the second plug terminal to be inserted, and a third insertion port configured to allow the pressing portion to be inserted, a first connection terminal disposed in the first insertion port, the first connection terminal being connected to the first movable piece, a second connection terminal disposed in the second insertion port, the second connection terminal being connected to the second movable piece, and a plunger movable between a first position and a second position, the plunger being configured to separate the first movable contact from the first fixed contact and separate the second movable contact from the second fixed contact at the first position, the plunger being configured to press the first movable piece toward the first fixed terminal to make the first movable contact move into contact with the first fixed contact and press the second movable piece toward the second fixed terminal to make the second movable contact move into contact with the second fixed contact at the second position, the plunger being configured to move from the first position to the second position by being pressed by the pressing portion of the electric plug inserted into the third insertion port, wherein the first movable piece includes a first tip portion connected to the first movable contact, a first base portion, and a first fulcrum located between the first tip portion and the first base portion, the first movable piece is pivotable around the first fulcrum, and the plunger is configured to press the first base portion to move the first movable piece away from the first fixed terminal, and press the first tip portion to move the first movable piece toward the first fixed terminal.

6. The power connector according to claim 5, wherein the first connection terminal includes a first receiving portion that supports the first fulcrum.

7. The power connector according to claim 1, wherein the plunger faces the third insertion port.

8. The power connector according to claim 1, wherein the plunger includes a plunger body, a first pusher projecting from the plunger body toward the first movable piece, and a second pusher projecting from the plunger body toward the second movable piece.

9. A power outlet for use with an electric plug including a pressing portion, the power outlet comprising:

a first fixed terminal;

a first fixed contact connected to the first fixed terminal;

a second fixed terminal;

a second fixed contact connected to the second fixed terminal;

a first movable contact facing the first fixed contact;

a first movable piece connected to the first movable contact;

a second movable contact facing the second fixed contact;

a second movable piece connected to the second movable contact;

a socket including a first insertion port, a second insertion port, and a third insertion port;

a first connection terminal disposed in the first insertion port, the first connection terminal being connected to the first movable piece;

a second connection terminal disposed in the second insertion port, the second connection terminal being connected to the second movable piece; and a plunger movable between a first position and a second position, the plunger being configured to separate the first movable contact from the first fixed contact and separate the second movable contact from the second fixed contact at the first position, the plunger being configured to press the first movable piece toward the first fixed terminal to make the first movable contact move into contact with the first fixed contact and press the second movable piece toward the second fixed terminal to make the second movable contact move into contact with the second fixed contact at the second position, the plunger being configured to move from the first position to the second position by being pressed by the pressing portion of the electric plug inserted into the third insertion wherein the first movable piece includes a first tip portion connected to the first movable contact, a first base portion, and a first fulcrum located between the first tip portion and the first base portion, the first movable piece is pivotable around the first fulcrum, and the plunger is configured to press the first base portion to move the first movable piece away from the first fixed terminal, and press the first tip portion to move the first movable piece toward the first fixed terminal.

10. The power outlet according to claim 9, further comprising:

a return spring configured to bias the plunger toward the first position.

11. The power outlet according to claim 9, wherein the first connection terminal includes a first receiving portion that supports the first fulcrum.

12. The power outlet according to claim 9, wherein the plunger includes a plunger body, a first pusher projecting from the plunger body toward the first movable piece, and a second pusher projecting from the plunger body toward the second movable piece.

13. The power outlet according to claim 9, wherein the plunger faces the third insertion port.

* * * * *